(12) United States Patent
Wendt et al.

(10) Patent No.: US 11,082,243 B2
(45) Date of Patent: Aug. 3, 2021

(54) POWER MANAGEMENT DEVICE FOR IMMEDIATE START-UP DURING POWER NEGOTIATION

(71) Applicant: SIGNIFY HOLDING B.V., Eindhoven (NL)

(72) Inventors: Matthias Wendt, Eindhoven (NL); Harald Josef Günther Radermacher, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 26 days.

(21) Appl. No.: 16/607,374

(22) PCT Filed: Apr. 13, 2018

(86) PCT No.: PCT/EP2018/059570
§ 371 (c)(1),
(2) Date: Oct. 23, 2019

(87) PCT Pub. No.: WO2018/197237
PCT Pub. Date: Nov. 1, 2018

(65) Prior Publication Data
US 2020/0145238 A1    May 7, 2020

(30) Foreign Application Priority Data

Apr. 24, 2017 (EP) .................................. 17167811

(51) Int. Cl.
*H04L 12/10* (2006.01)
*H04L 12/40* (2006.01)

(52) U.S. Cl.
CPC ........ *H04L 12/10* (2013.01); *H04L 12/40045* (2013.01)

(58) Field of Classification Search
CPC .......................... H04L 12/10; H04L 12/40045
USPC ......................................................... 713/300
See application file for complete search history.

(56) References Cited

U.S. PATENT DOCUMENTS

| 7,315,954 B2 * | 1/2008 | Van Lieu ................. G06F 1/30 713/310 |
| 7,501,720 B2 * | 3/2009 | Popescu-Stanesti ........................ H02J 7/0027 307/66 |
| 7,634,667 B2 * | 12/2009 | Weaver ..................... H02J 9/00 713/300 |
| 7,992,014 B2 * | 8/2011 | Langgood ............... H02J 3/005 713/300 |
| 9,986,509 B1 * | 5/2018 | Diwane ................... H04W 4/12 |
| 2008/0028237 A1 | 1/2008 | Knight |

(Continued)

FOREIGN PATENT DOCUMENTS

WO    2017017546 A2    2/2017

*Primary Examiner* — Robert A Cassity

(57) ABSTRACT

The present invention relates to an energy management device (40) and a method of operating the same. The energy management device (40) comprising a buffer controller (41) and an energy buffer unit (45) wherein the buffer controller is configured to connect the energy buffer unit (45) to operate a load device upon detecting that the load device is in an accepting operational state and the voltage provided by a power supply device is between the first and second threshold, during a power negotiation period between the power supply device (10) and the load device (20).

12 Claims, 5 Drawing Sheets

(56) References Cited

U.S. PATENT DOCUMENTS

| | | | |
|---|---|---|---|
| 2015/0068278 A1* | 3/2015 | Yazawa | F02P 19/027 |
| | | | 73/23.32 |
| 2016/0191256 A1 | 6/2016 | Wendt et al. | |
| 2017/0026188 A1* | 1/2017 | Herzel | H04N 5/765 |
| 2018/0034267 A1* | 2/2018 | Vasefi | H02H 3/027 |
| 2019/0179402 A1* | 6/2019 | Wendt | H04L 12/12 |
| 2019/0312241 A1* | 10/2019 | Vasefi | H01M 10/0525 |

* cited by examiner

POWER MANAGEMENT DEVICE FOR IMMEDIATE START-UP DURING POWER NEGOTIATION

CROSS-REFERENCE TO PRIOR APPLICATIONS

This application is the U.S. National Phase application under 35 U.S.C. § 371 of International Application No. PCT/EP2018/059570, filed on Apr. 13, 2018, which claims the benefit of European Patent Application No. 17167811.3, filed on Apr. 24, 2017. These applications are hereby incorporated by reference herein.

FIELD OF THE INVENTION

This invention relates to Power over Ethernet (PoE) systems. In particular it relates to energy buffered power concepts seamlessly integrated with compliant PoE installations allowing for short turn around timing, in particular in case of any power failures.

BACKGROUND OF THE INVENTION

WO2017/017546A2 discloses Power Supply Equipment, PSE, for use in a Power over Ethernet, PoE, system, wherein the PSE provides a voltage higher than a detection voltage yet lower than a supply voltage to cause a lighting means operating as a Powered Device, PD, to operate in an emergency mode.

US2017/026188A1 discloses a PoE power backup device, placed between a switch and a PoE enabled edge device, which comprises a power storage circuit which may store power received from the switch and to provide stored power to the edge device.

US2008/028237A1 discloses a PoE device comprising a battery bank which is charged over a PoE interface and can be controlled to transfer power to a further device over the PoE interface.

PoE is described in the IEEE802.3af/at standard and is currently being extended towards 4-pair power in the IEEE Task Force P802.3bt.

A typical PoE system consists of power sourcing equipment (PSE) and one or more PoE loads usually called powered devices (PD). In PoE systems power supply and data connectivity are sharing the same networking cable (e.g. a CAT6 cable) between output jacks of the PSE and the input jacks of the PDs. The standard for PoE does require PD identification and classification at any power up cycle for the PSE. To detect a valid PD device, the PSE applies a DC voltage between 2.8V to 10V across the power delivering lines. Based on the loop current, the PSE determines if there is a valid PD connected. The PD should present a resistive load between 19 K to 27 K Ohms with a parallel capacitor of 120 nF or less as a signature. To match the power delivering capability of the PSE and the power consumption of the PD, the second stage is to determine the power classification. This start up procedure from detection, over classification to normal power mode can take substantial time dependent on the PSE implementation.

A well-known limitation of PoE powered systems is the lack of simple means for uninterruptable power in case of mains power outage. On top of that the restart of a PoE system requires the PSE to renegotiate with all connected PDs before full power is applied again. That renegotiation can take a couple of seconds per port and usually is not executed in parallel for all ports but one after the other so that the lamps in a room will come up one after the other.

This blackout and start-up limitation is critical for the use of PoE in many applications, in particular in many lighting applications which often require dependable light operation and even an emergency lighting concepts. In addition, as the lamps will not start all together customers may get the impression of an unreliable lighting installation.

SUMMARY OF THE INVENTION

It is therefore an object of the present invention to provide an energy management device for improved start-up behavior of a load device, in particular a faster reaction time, in particular after a mains power glitch.

This objective is achieved by a device and method as defined in the independent claims.

According to a first aspect of the invention there is provided an energy management device coupled to a power supply device, which is operable in a device detection mode where the power supply device periodically applies a voltage between a first and second threshold, and in a power supply mode for providing power to load devices wherein the voltage is above the second threshold, and coupled to a load device operable in accordance with a predetermined power-acceptance criterion, in either an accepting operational state or a non-accepting operational state with respect to receiving power from the power supply device. The energy management device comprises an energy buffer unit and a buffer controller, wherein the buffer controller is configured to detect that the load device is in the accepting operational state and the voltage provided by the power supply device is between the first and second threshold, and to connect the energy buffer unit with the load device upon detecting that the load device is in the accepting operational state and the voltage provided by the power supply device is between the first and second threshold.

If the load device is in the accepting operational state and the voltage provided by the power supply device is between the first and second threshold, power negotiation is stated between the load device and the power supply device. By operating the load device with power provided by the energy buffer unit as soon as it has been detected that load device is in the accepting operational state and the voltage provided by the power supply device is between the first and second threshold, the load device does not have to wait until the power supply device provides the requested power but can start operation right away, thus showing an improved start-up behavior.

The power supply device is configured to operate in several modes wherein mode-specific input power is provided to the coupled load device. One of the modes in which the power supply device can be operated is the load device detection mode. In this mode, the power supply device provides either continuously or periodically a voltage between a first and second threshold. If the load device is in an accepting operational state, the resistance of the load device will be detected by the power supply device. The load device and the power supply device may enter into power negotiation wherein the load device indicates to the power supply device what amount of power it requires. The power supply device will change into the power supply mode for providing power to the load device wherein the voltage provided is then above the second threshold. A negotiation unit of the load device shall request power from the power supply device if the load device is in the accepting operational state and the voltage provided by the power supply device is between the first and second threshold. Upon detection of the same condition the buffer controller shall connect the energy buffer unit to operate the load device. The detection of both conditions may thus preferentially be performed in either one of the negotiation unit or the buffer controller and communicated to the respective other unit.

In an embodiment of the present invention, the energy management device is integrated in the load device. By integrating the energy management device in the load device a compact design is achieved in which the energy management device may be comprised in the load device as energy buffer circuitry integrated with the load device circuitry.

In an alternative embodiment, the energy management device is coupled in a daisy chain between the power supply equipment and the load device. In this embodiment the energy management device may considered as a midspan. The external arrangement allows to retrofit load devices without integrated energy buffer circuitry.

The energy buffer unit may preferentially be a rechargeable energy buffer unit, such as—but not limited to—a rechargeable battery.

The load device may preferentially be an application device powered over Ethernet, such as—but not limited to—a luminaire or an access point.

In an embodiment the buffer controller is further configured to connect the energy buffer unit with the load device upon detecting that the load device is in the accepting operational state and a voltage provided by the power supply device dropped below the second threshold. In case of an irregular power supply or even a power glitch, the voltage provided to the load device may drop below the second voltage threshold, in which case the buffer controller would connect the energy buffer unit with the load device. In particular after a power glitch it may be required to renegotiate the power supply between the power supply device and the load unit. Due to the power provided by the energy buffer unit, the load device does not have to await renegotiation but can continue operation. The load device is thus capable of uninterrupted operation in case of a mains power outage. An amount of energy stored in the energy buffer unit may thus preferentially be chosen such as to keep the load device fully operational during a time period required to restart the power supply device and renegotiate power supply.

The buffer controller may preferentially be configured to maintain the connection of the energy buffer unit with the load device for a predetermined time after the voltage provided by the power supply device has been unavailable. The load device may thus be adapted to power down only after the voltage provided by the power supply device is unavailable for a predetermined time.

An amount of energy stored in the energy buffer unit may thus preferentially be chosen such as to keep the load device fully or partially operational during a supply gap of an emergency power switch over.

In an embodiment the energy management device further comprises a charging and/or discharge control circuit. The energy buffer unit may preferentially be a rechargeable battery. Thus, after having provided energy to the load unit during start-up or during a power glitch, the battery should be recharged when the load device is provided with energy from the power supply device.

In an embodiment energy management device further comprises a data unit to receive activation and/or configuration settings. The activation and/or configuration settings may preferentially be received using a Link Layer Discovery Protocol (LLDP). LLDP may also be used to monitor and control other parameters of the buffer circuit like e.g. charging and discharging cycles, battery status, maximum buffer time, etc.

In an embodiment the energy management device further comprises a reporting unit to generate a report message about a power supply failure and to transmit the report to a corresponding management system. Preferentially, the reporting unit is configured to buffer the report message for retransmission until the voltage provided by the power supply device is between the first and second threshold or even above the second threshold. The energy management device my preferentially comprise a timestamp unit to provide a timestamp to the report message in order to facilitate time tracking at the management system even if the report arrives at a later point in time.

In an embodiment the energy management device further comprises a memory unit to store configuration settings of the load device. Preferentially, the buffer controller is configured to operate the load device according to the configuration settings stored in the memory, in particular after a restart. Again the configuration settings may comprise a time stamp and the buffer controller may be configured to only apply the configuration settings if the time stamp is not older than a predetermined time interval. The memory may also comprise a default value which may be applied instead. All setting values may be programmed during manufacture, installation or operation.

According to a second aspect of the invention there is provided a method for operating an energy management device coupled to a power supply device, which is operable in a device detection mode where the power supply device periodically applies a voltage between a first and second threshold, and in a power supply mode for providing power to load devices wherein the voltage is above the second threshold, and to a load device operable in accordance with a predetermined power-acceptance criterion, in either an accepting operational state or a non-accepting operational state with respect to receiving power from the power supply device. The method comprises detecting that the load device is in the accepting operational state and the voltage provided by the power supply device is between the first and second threshold, and connecting an energy buffer unit of the energy management device to operate the load device upon detecting that the load device is in the accepting operational state and the voltage provided by the power supply device is between the first and second threshold.

In an embodiment the method further comprises determining whether a value indicative of a first start is negative and performing the step of connecting the energy buffer unit to operate the load device only if the value indicative of a first start is negative.

Preferentially, the value indicative of a first start is set to true after a predetermined off time of the load device. This will deactivate the rapid start-up support when the load device has not been used for a long time, e.g. after shipping. A reasonable example can be a maximum off time of 24 h to keep start-up support functionality.

Preferentially, the method further comprises operating the load device according to configuration settings stored in a memory unit of the energy management device. There may be one or more configuration settings stored. Preferentially, the latest configuration setting is kept in the memory so that the load device may automatically resume operation using the previous setting. Alternatively or in addition, the configuration settings could be set to guarantee a minimal operations level for instance—but not limited to—emergency lighting etc. These configuration settings could again be set during manufacturing, installation and/or operation. A determination as to which settings should be applied after a restart, could be made in dependence of the conditions detected after a power drop. If for instance a power drop only occurred for a short time and the system immediately restarts and enters power renegotiations, operation of the load device may be resumed with the configuration settings as before the power drop. If the power glitch seems is not immediately recovered the load device may switch or resume to the emergency settings to provide a minimal operations level for a longer time.

It shall be understood that the load of claim 1 and the method for operating that load device of claim 13 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
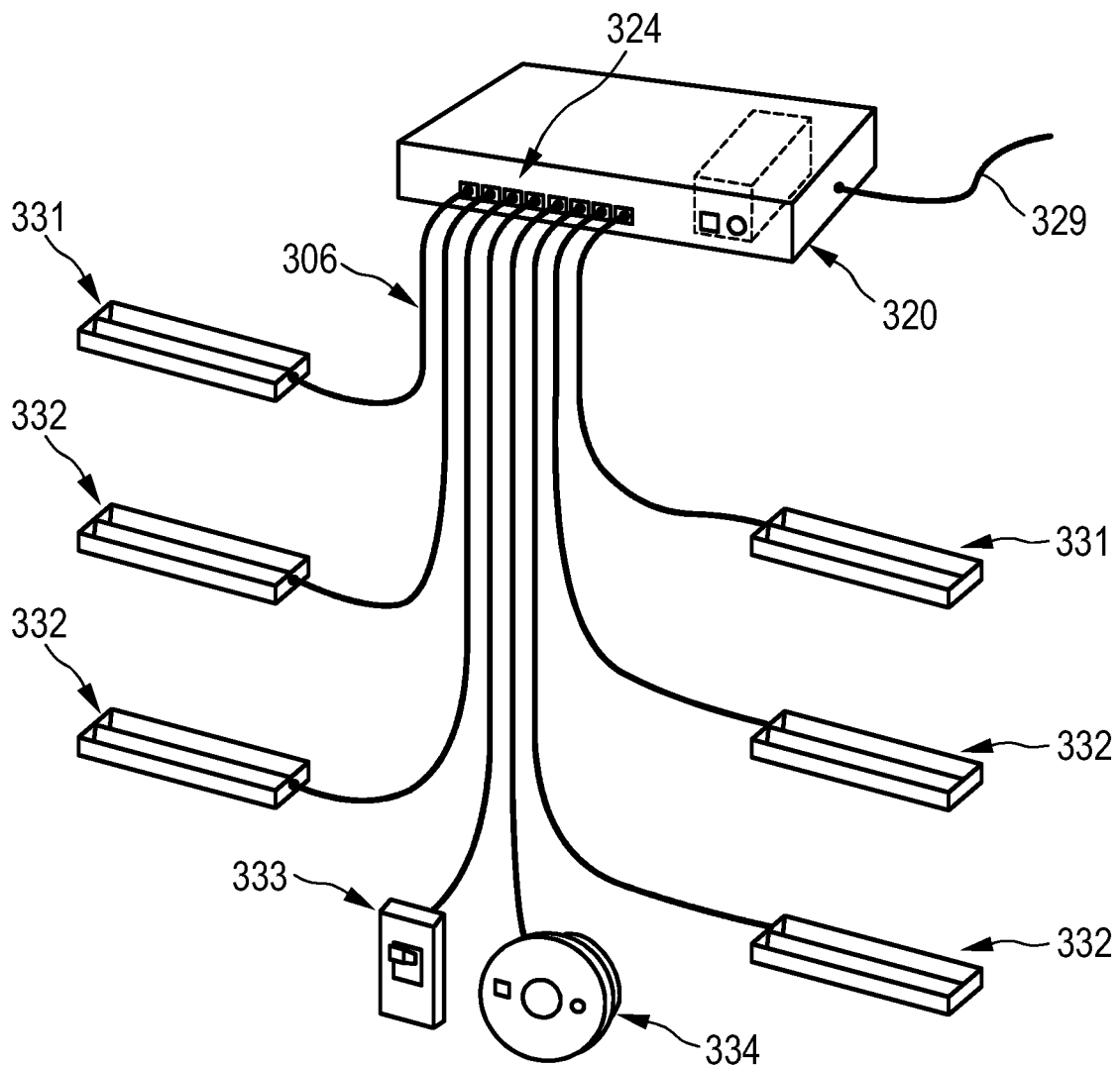
FIG. 1 schematically and exemplarily shows a lighting system powered over Ethernet.

FIG. 1 schematically and exemplarily shows at least parts of a lighting system wherein the system components are powered over Ethernet. The PDs may be e.g. light sources 331-332, user interface (UI) devices 333, such as but not limited to light control panels—and sensors 334 such as—but not limited to presence infrared sensors. Each PD is connected with PSE 320 via a separate cable 306, e.g. a CAT6 cable, via which the respective PDs receive data as well as power. The PSE 320 comprises a plurality of output jacks 324 and is connected to the network via cable 329.

In order to receive power from PSE 320 each of the PDs 331-334 has to request power from the PSE. Accordingly, the PSE 320 periodically applies a detection voltage across the power delivering lines 306 to detect a PD which is requesting power as long as that particular port is not already delivering power.

Figure 2:
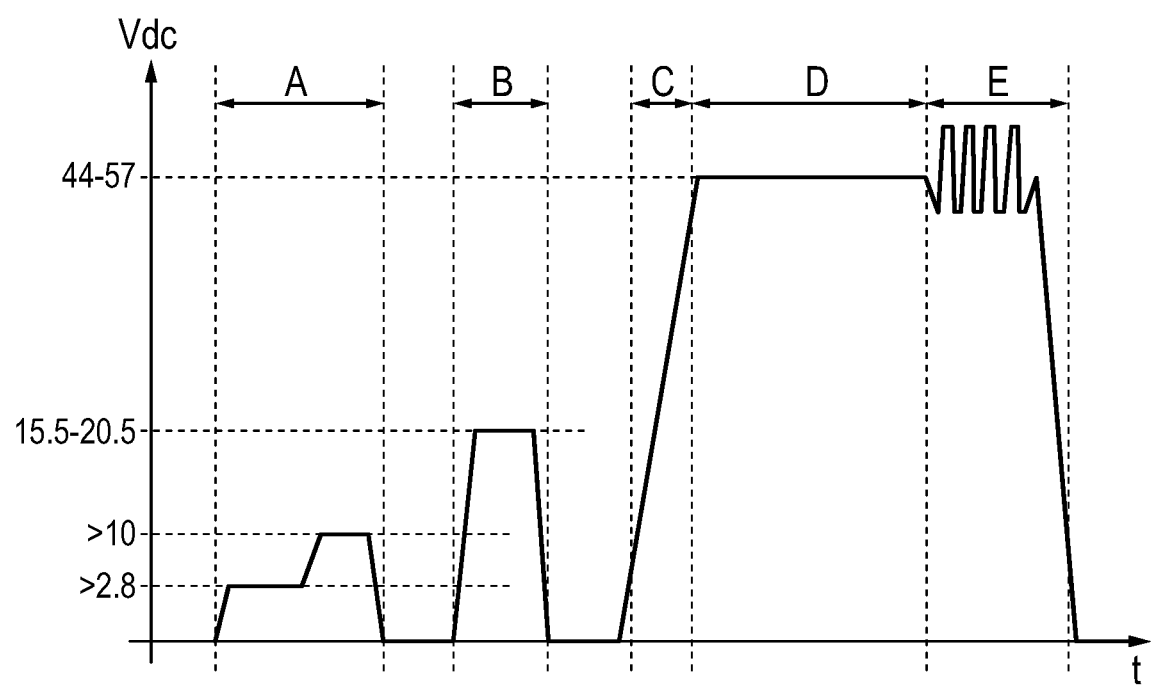
FIG. 2 schematically and exemplarily shows a voltage distribution curve provided by a power supply device from detection of a powered device to normal operation.

FIG. 2 illustrates schematically and exemplarily the voltage provided by a PSE 320 in different operation modes of the PSE. In a detection period A, which may last about 500 ms, the PSE applies a DC voltage in this embodiment between 2.8V to 10V across the power delivering lines. Based on the loop current, the PSE determines if there is a valid PD connected to a respective power delivery line. The PD should present a particular signature, for instance a resistive load between 19 K to 27 K Ohms with a parallel capacitor 120 nF or less. However, every other predetermined signature could be used. To match the power delivering capability of the PSE and the power consumption of the PD, the second stage B is used to determine the power classification. If the amount of power has been classified, the PSE starts to provide the requested power as indicated by the start-up period C. In normal operation as indicated in period D, the requested power is supplied as long as requested, e.g. as long as for instance a luminaire is switched on.

A load device according to an embodiment of the present invention is adapted to be powered by an integrated energy buffer unit during periods A to C until the PSE is ready to provide the requested power.

Figure 3:
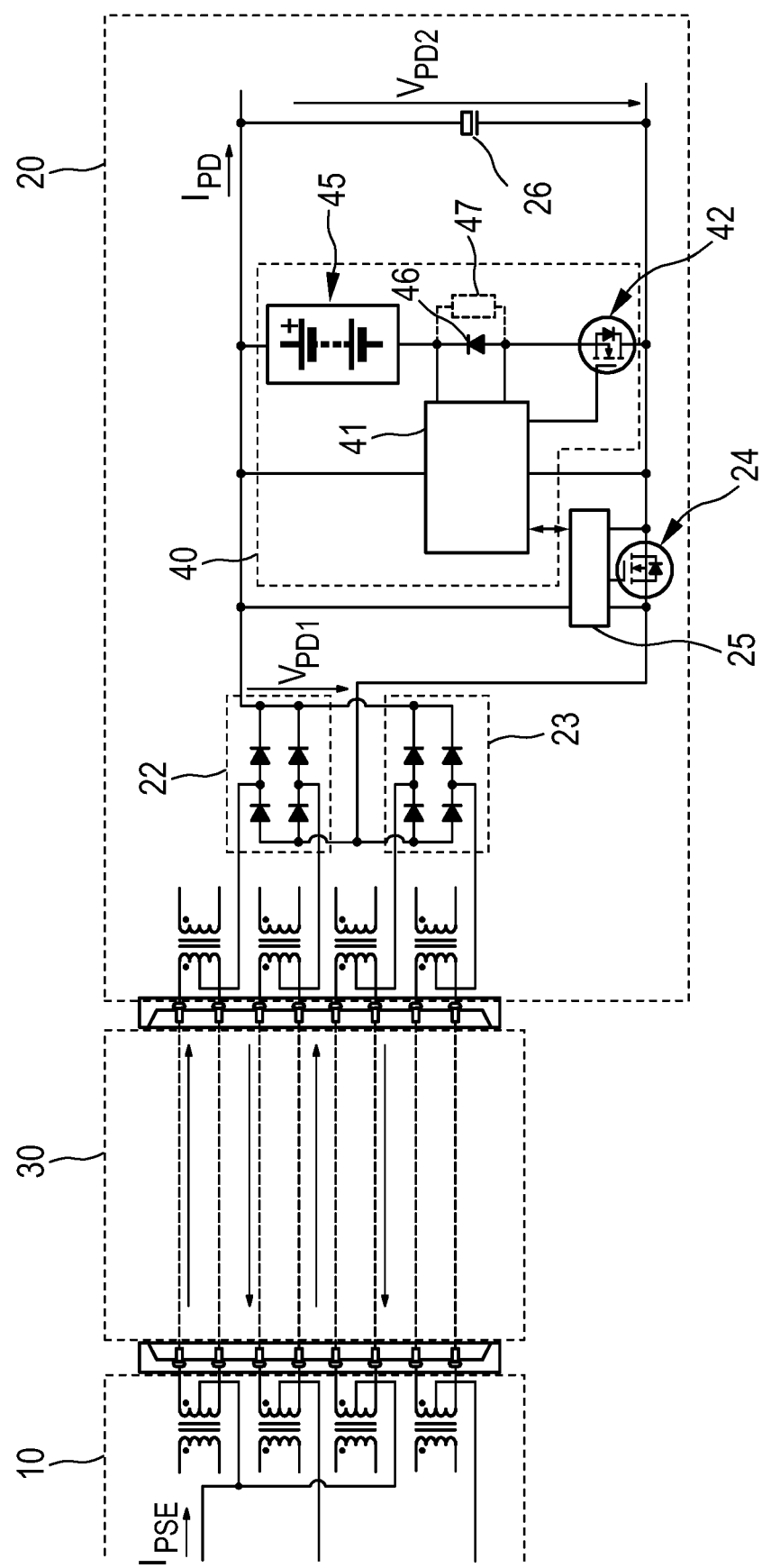
FIG. 3 schematically and exemplarily shows a load device according to an embodiment of the present invention.

FIG. 3 schematically and exemplarily shows a load device 20 according to an embodiment of the present invention connected via a networking cable 30 to power supply device 10. Behind the polarity correction rectifiers 22 and 23 a negotiation unit 25 with isolation switch (often called hot swap) 24 is connected. Application load 26 may for instance—but not limited to—be a luminaire, a camera, an access point transceiver, etc. The integrated energy buffer circuit 40 comprises the energy buffer unit 45, the buffer controller 41 and the energy buffer unit isolation switch 42. Preferentially, the energy buffer unit 45 is rechargeable, such that the energy buffer unit 45 can be recharged using power provided by the power supply device 10 upon establishing the power provision by the power supply device. In order to prevent that the charging current coming from the power supply device ($V_{PD2}$) flows unintentionally through the body diode of the energy buffer unit isolation switch 42, in this embodiment there is provided a diode 46 which is coupled in series between the energy buffer unit 45 and the isolation switch 42. In order to charge the energy buffer unit 45 a charging resistor 47 is provided in this embodiment. Alternatively, more sophisticated charging and discharging control circuitry may be integrated within the buffer control circuitry 41. This charging and discharging control circuitry may comprise DC/DC converters (not shown) in order to adapt any charging or discharging voltages for the energy buffer unit to the voltage ($V_{PD2}$) provided to the load device by the power supply device 10 in the power supply mode and to control the charging and discharging current.

The negotiation unit 25 is configured to request power from the power supply device 10 if the load device 20 is in the accepting operational state and the voltage provided by the power supply device 10 is between a first and second voltage threshold. Upon detection of the same condition the buffer controller 41 is configured to connect the energy buffer unit 45 with the application load 26. Negotiation unit 25 and energy buffer unit 45 may thus share this information as indicated in FIG. 3. In order to determine whether the power supply device 10 is currently operated in a particular voltage range, negotiation unit 25 and/or buffer controller 41 may comprise comparators (not shown). A first comparator may be configured to determine whether the current voltage level provided by the power supply device 10 is higher than the first threshold voltage, e.g. 2.8V. A second comparator may be configured to determine whether the current voltage level provided by the power supply device 10 is lower than a second reference voltage, e.g. 36 V. Each of the first and second comparators has a positive input and a negative input. A power input of the load device 20 may therefore be connected to the positive input of the first comparator and to the negative input of the second comparator. The first voltage threshold is provided to the negative input of the first comparator and the second voltage threshold (higher than the first reference voltage) is provided to the positive input of the second comparator. This electrical implementation provides a particularly simple voltage-level comparison. However, more complex solutions could be used instead. If the current voltage level of the input power is higher than the first voltage threshold and lower than the second voltage threshold, a corresponding switching control signal is provided that will cause the switching unit 42 to mutually connect the energy buffer unit 45 to operate the load 26 until the load device is powered by the power supply device 10, e.g. until the voltage level raises above the second threshold. As long as the voltage coming from PSE is lower than the battery voltage the diode 46 would conduct and hence supply 26 from the battery.

The load device 20 may also be powered by the energy buffer unit 45 in case the voltage provided by the power supply device 10 is interrupted for a short period, for instance during a mains power glitch, which even for short interruptions of the main power would require a restart of the system and thus a renegotiation of the power requirements between the power supply device 10 and all connected load devices. The energy stored in the buffer energy unit 45 may be chosen such as to keep the load 26 fully operational (e.g. a luminaire PD generating light at 100% dimming value) for a predetermined period of time, e.g. the average restart period known or measured for the system plus a small buffer, which may be in the order of 30 seconds. If the load device 20 is for instance a luminaire in a lighting system, the luminaire would continue to light the room during a new negotiation cycle from its local energy storage such that the power glitch may not or almost not be received by a person in that room. In order to remember the last operating configuration, e.g. dimming level or a color temperature of a luminaire, the load device may further comprise a memory (not shown). The latest operational configuration received by the luminaire may be kept in the memory so that the load automatically resumes using the latest operational configurations. For a luminaire this could for instance be color temperature and/or dim value as been active at power down or power interruption. Alternatively, the memory may store a default configuration which may be programmed during manufacture, installation or normal operations. In yet another alternative embodiment, the configuration may be programmed such as to provide an emergency configuration, which in case of a lighting system could provide lighting levels compliant with emergency light. Energy buffer size and capacity could be optimized to provide enough power for the worst-case supply gap during the typical emergency power switchover.

The load device may further comprise a data unit (not shown) to receive messages from a control unit in order set the configuration settings of the load device. The programming of the configuration settings stored in the memory unit of the local device 20 may be executed using the Link Layer Discovery Protocol (LLDP). LLDP is a vendor-neutral link layer protocol in the Internet Protocol Suite. The protocol is formally referred to by the IEEE as Station and Media Access Control Connectivity Discovery specified in IEEE 802.1AB. LLDP may also be used to monitor the energy buffer function and control, as well as charging and discharging cycles in order to keep track of the energy buffer status.

The buffer controller 41 may further be configured to power down the load device after the voltage provided by the power supply device 10 is missing for a predetermined time, which may be freely programmable from 0 to a time period until the energy buffer unit power is empty. The predetermined time may again be stored in the memory device using LLDP.

Furthermore, the load device 20 may comprise a reporting unit to report a power failure to the building management system. Since usually in case of a power failure, the data communication is down as well, the generated report may be time stamped by a time stamp unit and buffered for later transmission by the reporting unit.

Preferentially, the load device 20 is programmed with a maximum off-time to deactivate the rapid start-up support such that the energy buffer unit 45 is not connected by the buffer controller 41, e.g. after shipping. A reasonable example could be a maximum off time of 24 h to keep start-up support functionality. The load device 20 may thus be programmed to comprise a variable indicative of a first start, which may be set to false or true. If the variable was found to be true when the load device is in the accepting operational state and the voltage provided by the power supply device is between the first and second threshold, the energy buffer unit 45 would not be connected by the buffer controller 41 during period A.

Figure 5:
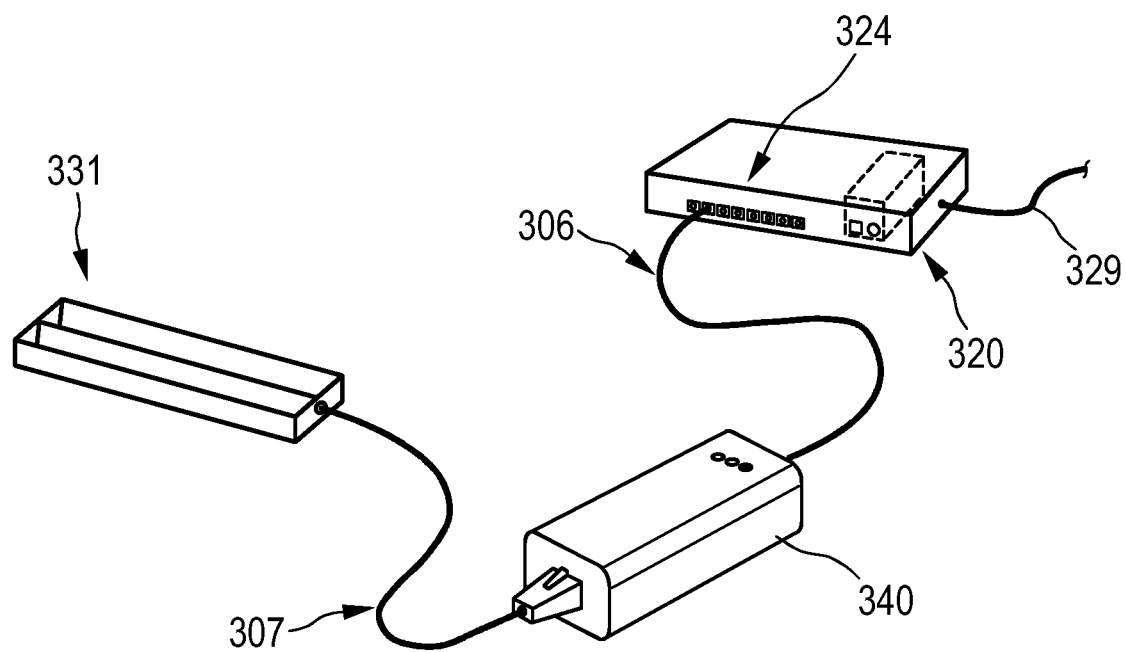
FIG. 5 schematically and exemplarily shows a further load device according to an embodiment of the present invention.

In an alternative embodiment of the present invention, the energy buffer circuit may be comprised in a separate, daisy chained energy management device 340 which is connected between the load device and the power supply device in series as depicted in FIG. 5. The energy management device 340 may be considered as midspan and keeps track of a record of the last power negotiation and repeat the related signals into the power supply device direction 306 during a subsequent power-up. The power supply device voltage gets buffered by the energy buffer unit comprised in the midspan in the direction 307 to the load device during periods A-C in FIG. 2. Load device 331 and the power supply device 320 do only "see" each other during the first negotiation cycle. Consecutive cycles are caught by the midspan device 340 which only repeats the first negotiation in order directly powering up the load device. During periods A-C the midspan provides the load device with energy from its energy buffer unit. In subsequent negotiation cycles the midspan may conduct the power negotiations on behalf of the load device. The midspan device 340 may therefore comprise a recording of current drawn by the load device 331 during the first negotiation. In subsequent cycles the midspan device 340 may then isolate the power supply device 320 from the load device 331 as the load device 331 is powered from the battery comprised in the midspan device 340 and replay exactly the recorded currents on the power supply device side 306.

Figure 4:
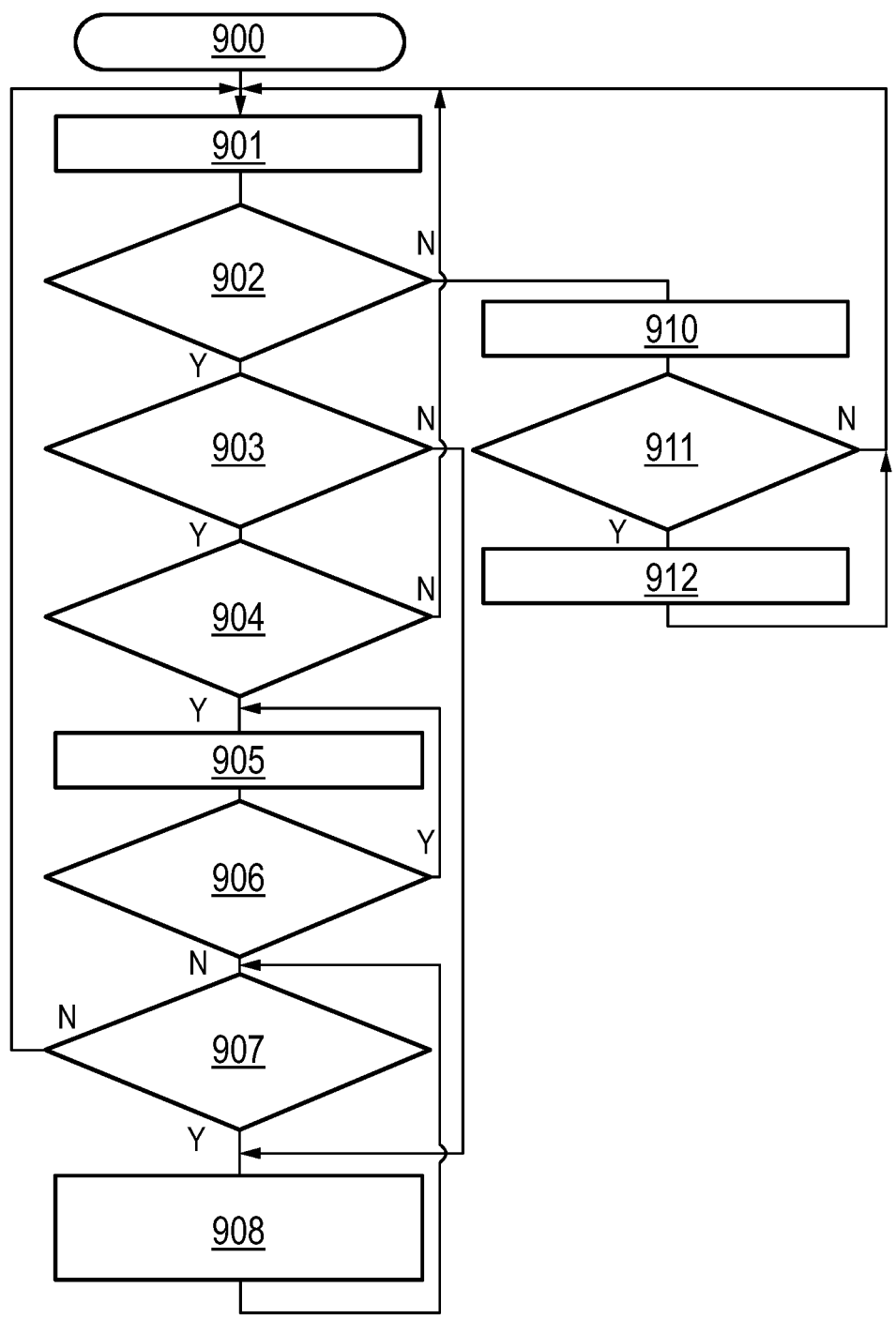
FIG. 4 shows a flow chart schematically and exemplarily illustrating a method for operation of a load device according to an embodiment of the present invention.

FIG. 4 shows a flow chart schematically and exemplarily illustrating a method for operation of the load device 20 or the midspan device 340 according to an embodiment of the present invention. The method requires at least a minimally charged energy buffer unit 45 as a starting point 900. In a first step 901, the voltage $V_{PD1}$ is measured. Next, 902, it is determined whether the measured voltage is above a first threshold, e.g. 2.8 V, and below a second threshold (step 903), e.g. 36 V. If both conditions are met, it is preferentially further determined in step 904, whether a value indicating a first start of the load device is set to false. If the load device has been recently used, for instance before a power glitch or another interruption, the last conditions should be met as well. In that case the load 26 shall be powered by the energy buffer unit 45 (step 905) as long as the voltage $V_{PD1}$ is determined to be between the first and second threshold (step 906), e.g. above 2.8 V and below 36 V. If the voltage $V_{PD1}$ Is determined not to be within the interval set by the first and second threshold, It is further determined (907), whether the voltage $V_{PD1}$ is above the second threshold. In that case, the power provided by the power supply device is put through to the low 26. In case the batteries are rechargeable battery, the power provided by the power supply device should also be used to recharge the energy buffer unit 45. In case of value indicating a first start is used by an embodiment of the present invention, this value should be set to false. In step 908 as well. This configuration is maintained as long as the voltage $V_{PD1}$ provided by the provided by the power supply device is above the second threshold, e.g. 36V. In case it is determined in step 907 that the voltage dropped below the 2nd threshold, the method continues with step 901.

If it is determined in step 903 that the voltage is above the second threshold, then the method directly jumps to step 908.

In an optional side routine which is checked if the voltage determined in step 902 is below a first threshold, whether off-time keeping is activated in the load device (step 910). If not, the method jumps back to step 901. If, however, off-time keeping is activated, it is determined in a next step 911 whether a monitored off-time value is larger than a predetermined value. If the monitored off-time value is larger than a predetermined value, the value indicative of a first start is set to true (step 912). The method comes back to step 901. However, since the value indicative of the first start is now set to true, the low device will not be powered by the energy buffer unit until it is being operated receiving power from the power supply device and the value indicative of the first starter set to false. The side routine, thus, ensures that the rapid start-up support is deactivated when the load device has not been used for a long time, e.g. after shipping, deinstallation, etc. A reasonable off-time may be a maximum off-time of 24 h to keep start-up support functionality. The value indicative of a first start may also be set to true in case the battery is almost empty.

Procedures like requesting power, determining if the load device is in the accepting operational state and the voltage provided by the power supply device is between the first and second threshold, et cetera performed by one or several units or devices can be performed by any other number of units or devices. These procedures and/or the control of the load device in accordance with the method for operating the load device can be implemented as program code means of a computer program and/or as dedicated hardware.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An energy management device coupled to a power supply device, which is operable in a device detection mode where the power supply device periodically applies a voltage between a first threshold and a second threshold over a determined time period to detect a connection status of load devices, and in a power supply mode for providing power to load devices wherein the voltage is above the second threshold, and coupled to a load device operable in accordance with a predetermined power-acceptance criterion, in either an accepting operational state or a non-accepting operational state with respect to receiving power from the power supply device, the energy management device comprising:
an energy buffer,
a buffer controller, wherein the buffer controller is configured to detect that the load device is in the accepting operational state and the voltage provided by the power supply device has dropped below the second threshold and is between the first threshold and the second threshold, and to connect the energy buffer with the load device responsive to detecting that the load device is in the accepting operational state and the voltage provided by the power supply device has dropped below the second threshold and is between the first threshold and the second threshold, and to maintain connecting the energy buffer with the load device for a predetermined time after the voltage provided by the power supply device has dropped below the second threshold.

2. The energy management device according to claim 1, wherein the energy management device is integrated in the load device.

3. The energy management device according to claim 1, wherein the energy management device is coupled in a daisy chain between the power supply equipment and the load device.

4. The energy management device according to claim 1, further comprising a charging control circuit for charging the energy buffer.

5. The energy management device according to claim 1, wherein the energy management device is configured to receive activation and/or configuration settings for operation the load device.

6. The energy management device according to claim 1, wherein the energy management device is configured to generate and transmit a report message about a power failure to a corresponding management system if the voltage provided by the power supply device in the power supply mode dropped below the second threshold.

7. The energy management device according to claim 6, wherein the energy management device is configured to buffer the report message for retransmission until the voltage provided by the power supply device is between the first threshold and the second threshold.

8. The energy management device according to claim 6, wherein the energy management device is configured to provide a timestamp to the report message.

9. The energy management device according to claim 1, further comprising a memory to store configuration settings of the load device.

10. The energy management device according to claim 9, wherein the buffer controller is configured to connect the energy buffer to operate the load device according to the configuration settings stored in the memory upon detecting that the load device is in the accepting operational state and a voltage provided by the power supply device dropped below the second threshold.

11. A method for operating an energy management device coupled to a power supply device, which is operable in a device detection mode where the power supply device periodically applies a voltage between a first threshold and a second threshold over a determined time period to detect a connection status of load devices, and in a power supply mode for providing power to load devices wherein the voltage is above the second threshold, and to a load device operable in accordance with a predetermined power-acceptance criterion, in either an accepting operational state or a non-accepting operational state with respect to receiving power from the power supply device, the method comprising:

detecting that the load device is in the accepting operational state and the voltage provided by the power supply device dropped below the second threshold and is between the first threshold and the second threshold, and only performing the step of connecting an energy buffer of the energy management device with the load device responsive to detecting that the load device is in the accepting operational state and the voltage provided by the power supply device dropped below the second threshold and is between the first threshold and the second threshold, and maintaining connecting the energy buffer with the load device for a predetermined time after the voltage provided by the power supply device has dropped below the second threshold.

12. The method according to claim 11, further comprising determining whether a variable indicative of a first start for the load device is set to false and performing the step of connecting the energy buffer to operate the load device only if the variable indicative of the first start is set to false; wherein the variable indicative of the first start is set to true after a predetermined off time of the load device and the variable indicative of the first start of the load device is set to false after receiving power from the power supply device.

\* \* \* \* \*